C. MEYER & J. EVANS.

Improvement in Rubber Overshoes.

No. 4,977. Reissued July 16, 1872.

Witnesses.
W. A. Graham
Alex T. Roberts

Inventors.
C. Meyer.
per John Evans.
Attorneys.

UNITED STATES PATENT OFFICE.

CHRISTOPHER MEYER, OF NEW YORK, N. Y., AND JOHN EVANS, OF NEW BRUNSWICK, NEW JERSEY.

IMPROVEMENT IN RUBBER OVERSHOES.

Specification forming part of Letters Patent No. 111,962, dated February 21, 1871; reissue No. 4,977, dated July 16, 1872.

Specification describing a new and useful Improvement in India-Rubber Shoes, invented by CHRISTOPHER MEYER, of the city, county, and State of New York, and JOHN EVANS, of New Brunswick, in the county of Middlesex and State of New Jersey.

Our invention relates to the strengthening ribs employed upon the uppers of India-rubber shoes; and consists in an improvement which will be hereinafter described and subsequently specified in claim.

Figure 1:
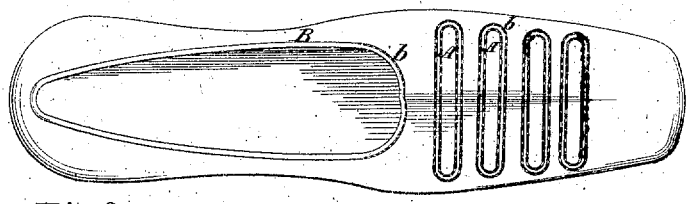
Figure 3:
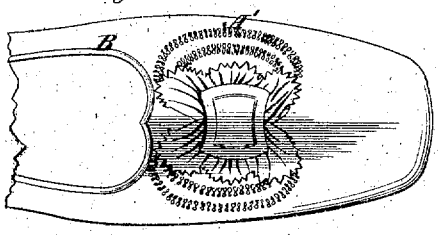
Figure 4:
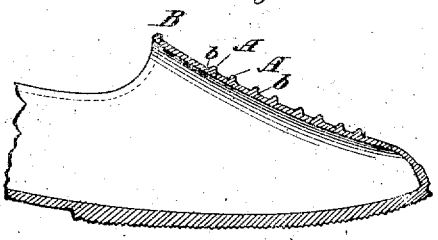
Figure 2:
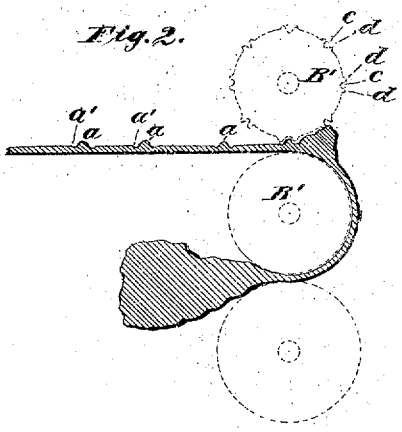

Figures 1 and 3 represent plan views of two modifications of these ribs; and Fig. 2, a sectional view of forming-rolls, with the plastic substance passing therethrough. Fig. 4 is a section of Fig. 1.

A A in Fig. 1 represent plain ribs inclosing a space in configuration similar to the openings in the uppers of ordinary rubbers. B represents a rib around the top or mouth of the shoe. *b* is an imitation thread passing around each rib. A′ A′ in Fig. 3 represent the ribs arranged in the form of a single ornamental buckle. B′ in Fig. 2 represents rolls, of which the lower is plain and the upper ribbed or pointed at *d*, and grooved at *c*, to make the strengthening-ribs A A′ or B, and the rows of imitation stitches *b*, which said ribs and grooves will be in any form or shape and location on the roller, according to the form or location of the rib or other device it is desired to produce. The imitation stitches may consist either of indentations formed in the surface of the sheet, or points projecting above the surface—the one will be formed by projections on the rollers, and the other by indentations. *a a* represent the ribs formed from the plastic rubber as it is carried through the rolls, and it will be observed that they are not corrugations like the strengthening-ribs used upon metal, but a thickening up of the substance in certain lines or directions. *a′* in this figure represents the indentations to imitate thread-stitches.

The process through which the material passes to bring it into the form required is as follows:

The mass of plastic rubber is forced into the opening between the molding or shaping rolls and drawn out into a sheet with the ribs and points or indentations completely shaped. It is then made up into the shoe or sandal and vulcanized. We thus produce these ribs or figures in homogeneous connection with the other part of the sheet. They are, therefore, better than when formed of separate strips pasted on in the gummy state after the sheet is formed and secured to it in the vulcanizing process, as in the common way, and being formed at the same time the sheet is rolled and by the same operation. It is done without expense other than the preparing of the grooves, indentations, and points in the rollers. Moreover, the said ribs or figures will be much more perfect and uniform than when done by hand. The same is true in regard to the imitation stitching, also, which has heretofore been made by a pointed wheel rolled alongside of the ribs by hand.

Having thus described our invention, we claim as new and desire to secure by Letters Patent—

As a new article of manufacture India-rubber shoes with strengthening or other ribs homogeneous with the substance of the body, formed by thickening up the said substance in the forming of the sheet, substantially as specified.

C. MEYER.
JOHN EVANS.

Witnesses:
ANSON P. THAYER,
W. A. GRAHAM.